F. STREICH.
BREAD WRAPPER SEALER.
APPLICATION FILED MAY 13, 1913.
1,081,560.
Patented Dec. 16, 1913.
2 SHEETS—SHEET 1.
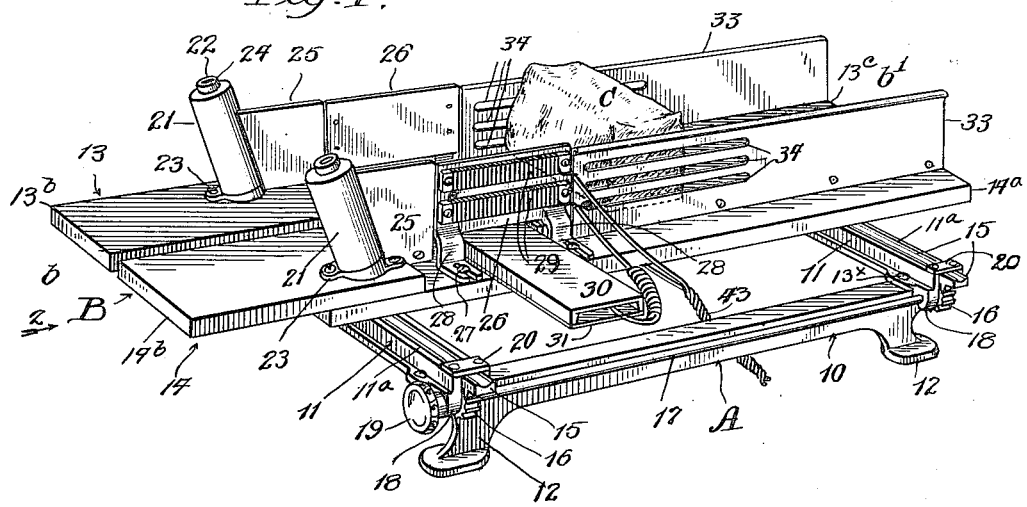
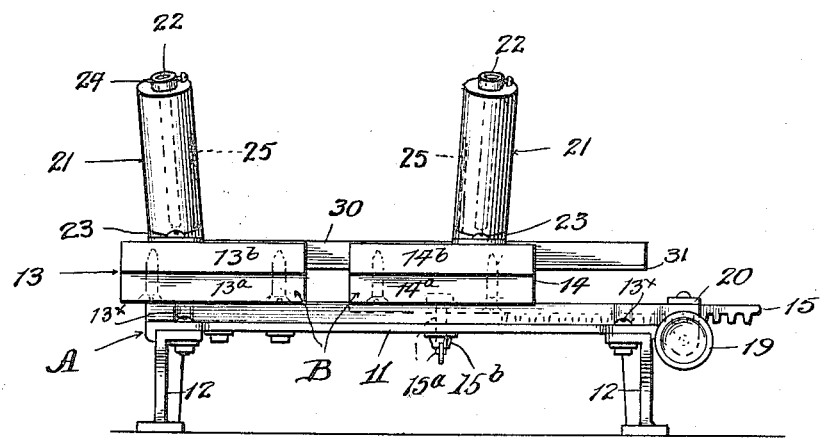
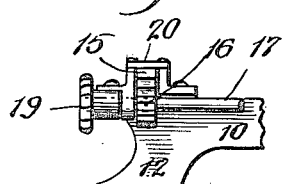
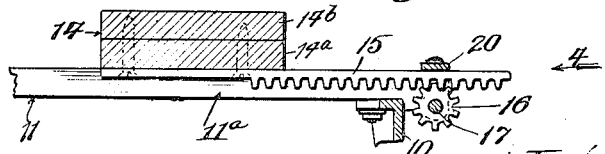
Witnesses:
Esther Sundem
Jean Agness.
Inventor:
Frank Streich,
by Charles O. Sherwey
his Atty.

F. STREICH.
BREAD WRAPPER SEALER.
APPLICATION FILED MAY 13, 1913.
1,081,560.
Patented Dec. 16, 1913.
2 SHEETS—SHEET 2.
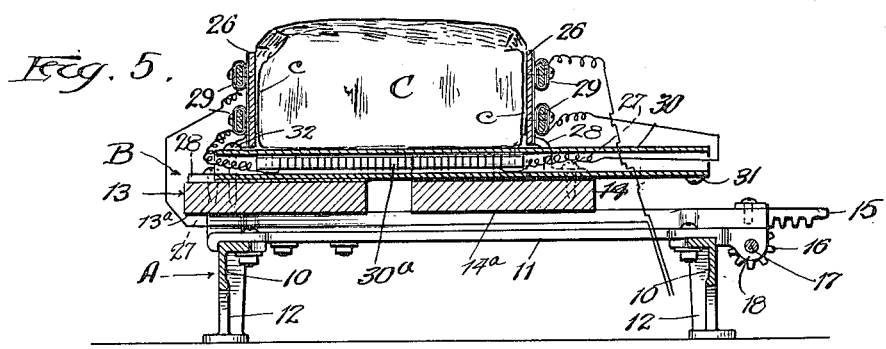
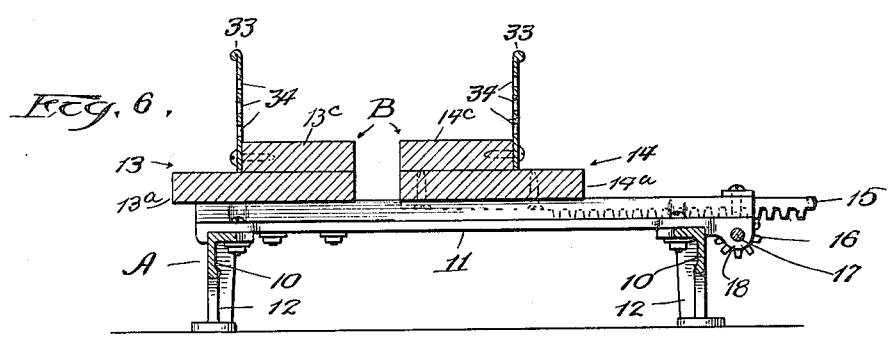
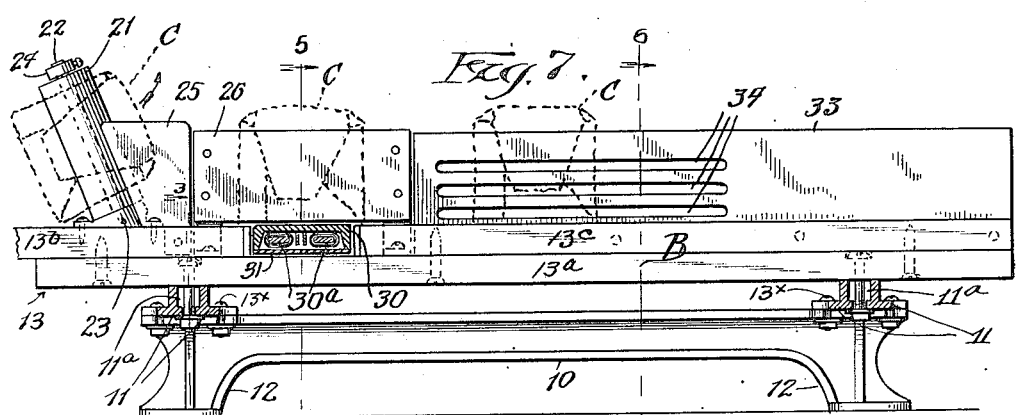
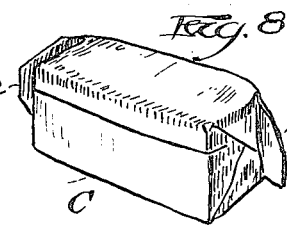
Witnesses:
Esther Lundeen
Jean Agness
Inventor;
Frank Streich,
by Charles O. Shervey
his Atty.

UNITED STATES PATENT OFFICE.

FRANK STREICH, OF JOLIET, ILLINOIS.

BREAD-WRAPPER SEALER.

1,081,560.  Specification of Letters Patent.  Patented Dec. 16, 1913.

Application filed May 13, 1913. Serial No. 767,327.

*To all whom it may concern:*

Be it known that I, FRANK STREICH, a citizen of the United States, and a resident of Joliet, county of Will, and State of Illinois, have invented certain new and useful Improvements in Bread-Wrapper Sealers, of which the following is declared to be a full, clear, and exact description.

This invention relates to bread wrapper sealers, and its primary object is to provide an improved device for sealing bread wrappers, or wrappers for other commodities, where the desideratum is to inclose the commodity with a sealed wrapper. Wrappers used for this purpose are preferably composed of light weight paraffined or waxed paper.

Another object is to provide a device in which the parts, (which act on the wrapper) are capable of lateral adjustment so as to accommodate wrapped bread or other parcels of different sizes.

Another object is to provide a sealing device with heat applying plates which are heated by electric resistance coils, so as to afford a practically sanitary device.

Another object is to provide means for rapidly cooling the wrapper immediately after heat has been applied to it, thereby insuring adhesion of all of the sealed flaps of the wrapper.

Other objects and advantages will appear in the course of this specification, and with all these objects and advantages in view, this invention consists in the several novel features hereinafter fully set forth and more particularly defined in the claims.

The invention is clearly illustrated in the drawings furnished herewith of which—
Figure 1, is a perspective view of a complete bread wrapper sealer, embodying the preferred form of this invention; Fig. 2, is an end view thereof looking in the direction of the arrow, in Fig. 1; Fig. 3, is a detail, vertical cross section taken on the line 3—3 of Fig. 7, showing certain mechanism for adjusting the laterally adjustable table; Fig. 4, is a detail, front view of the adjustment mechanism seen in Fig. 3, the view being taken in the direction of the arrow 4, in said figure; Fig. 5, is a detail, vertical section of a heat applying mechanism taken on the line 5—5 of Fig. 7; Fig. 6, is a detail vertical cross section through the table, taken on the line 6—6 of Fig. 7; Fig. 7 is a central, vertical, longitudinal section of the device, and Fig. 8, is a perspective view of a wrapped loaf of bread, with the end flaps of the wrapper extended; this is the condition of a wrapper before it is acted upon by the present form of bread wrapper sealers.

Referring to said drawings, which illustrate the preferred embodiment of the present invention, A, represents a main supporting frame, comprising longitudinal frame bars 10, and transverse frame bars 11; the longitudinal frame bars 10, are provided with feet 12, and the transverse frame bars 11, rest upon and preferably are detachably secured to the longitudinal frame bars, as for instance, by means of bolts 13$^x$. Resting upon said frame A, is a table B, which carries flap folding rollers, the sealing mechanism and cooling plates, and said table is preferably composed of two substantially similar leaves 13, 14, the one leaf 13, being stationarily supported upon the frame A, while the other leaf 14, is slidably mounted thereon. The leaves of the table are preferably made up of lower members 13$^a$, 14$^a$, which extend across transverse bars 11, and upper members 13$^b$, 13$^c$, 14$^b$, 14$^c$, secured to said lower members, there being a gap between the members 13$^b$ and 13$^c$, of the leaf 13, and between the members 14$^b$ and 14$^c$, of the other leaf 14, for receiving a certain heat applying plate, as will be described hereinafter. Means are provided for moving the slidable leaf (and the parts carried thereby) laterally with respect to the stationary leaf, and one form of means comprises rack bars 15, secured to the underside of the leaf 14, and suitably operated pinions 16. Said rack bars extend through slots 11$^a$, in the frame bars 11, to the front of the frame A, and mesh with the pinions 16, which are shown as fast upon a shaft 17, journaled in bearings 18, at the forward ends of the transverse frame bars 11; said shaft 17, has a hand wheel 19, fixed upon one end by means of which the shaft and pinions may be rotated to shift the rack bars back and forth, and thereby regulate the width of the table B. A bolt 15$^a$, extending through one rack bar 15, and slot 11$^a$, of the bar 11, and a wing nut 15$^b$, bearing against the underside of said bar 11, furnishes means for holding the table in any position of adjustment. A plate 20, is secured to each transverse frame bar 11, at its forward end and above the rack bar so as to guide the forward end thereof in intermeshed condition with the pinions.

Upon each leaf of the table are secured means for folding down the end flaps of the bread wrapper, means for applying heat thereto, and means for permitting the rapid cooling of said end flaps, after heat has been applied thereto sufficiently to melt or partly melt the paraffin or wax, with which the bread wrapper is saturated, and in addition thereto, one of the leaves is provided with means for heating the lower side of the bread wrapper, and preferably this device is attached to the stationary leaf of the table, and is of such a length that the movable leaf of the table may be separated a considerable distance away from its companion leaf, so as to accommodate a comparatively long loaf of bread or parcel.

The flap folding, heat applying and cooling devices will now be described.

Upon each leaf 13, 14, of the table is a flap folding roller 21, which is journaled upon a spindle 22, that projects up from a base plate 23, there being one base plate secured to each upper leaf member 13$^b$, 14$^b$. Preferably a collar 24, is secured to each spindle 22, above the roller 21, so as to permanently retain it on the spindle 22. The rollers 21, are oppositely disposed with respect to each other and extend upward from the table in oblique lines with respect thereto, inclining toward the receiving end $b$, of the table and preferably being spread farther apart at their upper ends than at their lower ends as indicated in Figs. 1 and 2. In the operation of the machine, said flap folding rollers 21, operate to fold down the end flaps $c$, of the bread wrapper C, (see Fig. 8) just prior to its engagement with the heat applying devices.

Immediately beyond the flap folding rollers are oppositely disposed upright plates 25, which project up from and are secured to the table leaves; said plates are arranged to stand almost tangential with the opposing faces of the flap folding rollers 21, as clearly indicated in Fig. 2. In alinement with each plate 25, and spaced therefrom is a vertical heat radiating plate 26, which is secured to the table. The plates 26, are shown as having downwardly projecting brackets 28, that rest on the members 13$^a$, 14$^a$, of the leaves and are fastened thereto, as for instance by screws 27, that pass through slots in the brackets and are screwed into said leaf members 13$^a$, 14$^a$. Said plates 26, are oppositely disposed with respect to each other, and secured to the outer faces thereof are resistance coils 29, for heating said plates 26. Said plates 26, span the gap between the upper leaf members and the lower edges of said plates 26, are spaced away from the upper leaf members 13$^b$, 14$^b$. Secured to the lower stationary leaf member 13$^a$, is a horizontally extending heat radiating plate 30, which extends across the table B, in the gap between the upper leaf members, and said plate is practically flush with the upper faces of said upper leaf members. Said plate is of sufficient length to permit a wide range of adjustment between the two leaves of the table B, and is in the form of a channel member, having on its underside, a plate of heat non-contacting material, such as asbestos 31, which is interposed between the lower edge of the channel shaped plate 30, and the stationary member 13$^a$, of the leaf 13. The heat applying plate 30, may be secured to said leaf 13, by screws 32, which pass through the plate and into the leaf 13. To the underside of the horizontal heat applying plate 30, is secured a resistance coil 30$^a$, for heating said plate, and all of the resistance coils are properly wired together and may be connected to a main conductor 43, having a plug (not shown) which may be plugged into a socket of an electric circuit.

The oppositely disposed heat applying side plates 26, and horizontal bottom plate 30, provide means for applying heat to the two end flaps of wrappers and to the underside thereof, whereby the paraffined or waxed paper, as the case may be, may be heated sufficiently along the parts contacting with said plates, to melt or partly melt the paraffin or wax of the contiguous portions of the wrapper, which, when cooled, will seal those parts together.

Beyond each heat applying plate 26, is a longitudinally extending side plate 33, which is also spaced away from said heat applying plate 26, and said side plates 33, are oppositely disposed and preferably extend to the delivery end $b^1$, of the table; they are secured to the outer side edges of the upper members 13$^c$, 14$^c$ of the leaves, (see Fig. 6) as for instance by means of screws. Each side plate 33, is formed with a plurality of air openings 34, here shown in the form of longitudinally extending slots, through which the end flaps of the wrappers may be exposed to the air for the purpose of rapidly cooling the paraffin or wax, thereby insuring the rapid setting and adhesion of the side flaps to the remainder of the wrapper.

In operation the table is adjusted to accommodate the loaves of bread or other parcels to be operated upon, by turning the hand wheel 19, in the proper direction so as to bring the sealing devices 26, into close contact with the ends of the wrapper, and the wing nut 15$^b$, is then screwed up so as to hold the slidable leaf of the table firmly against displacement. The workman stands near the receiving end $b$, of the device, wraps a loaf of bread with a paraffin or wax paper wrapper C, leaving the end flaps $c$, extended as shown in Fig. 8. Thereupon he inserts the wrapped loaf sidewise between the flap folding rollers 21, as shown in Fig. 7, simultaneously turning the loaf in the direction of the arrow, and then pressing it down so as to bring the bottom of the wrapper against the top of the table B, the rollers acting to fold down said end flaps as the loaf is pressed therebetween. He then forces the wrapped loaf past the plates 25, and to the heat applying plates 26, 30, leaving the wrapped loaf at that place while he wraps another and inserts it between the rollers, pushing it forward against the first loaf, and pushing the first loaf along the table to the plate 33, where said loaf is left standing between the parts of said plate containing the air passages. While the wrapper remains between and over the heat applying plates, the heat, radiating therefrom, heats the paraffin or wax sufficiently to melt or partly melt the same, and when the wrapped loaf has been moved over to a point between the cooling plates, the paraffin or wax sets very rapidly, on account of the exposure of the wrapper to the outer atmosphere through the perforated side plates, thus causing the contiguous heated portions of the wrapper to adhere and seal the contents. This provides a substantially continuously operating device since one parcel is made to force the next one onward toward the delivery end of the device, where they may be gathered and disposed of, as desired.

It is to be observed that the device is extremely simple, yet very efficient in operation, that it is sanitary and does not require much attention to keep it in a sanitary condition and in perfect working order.

While I have described the device as particularly adapted for sealing bread wrappers, it is perfectly obvious that it may be employed for sealing wrappers for other articles.

More or less variation is possible in the details of construction without departing from the spirit of this invention, and I do not, therefore, desire to limit myself to the exact form of construction shown and described, except as may be necessitated by the prior state of the art.

I claim as new and desire to secure by Letters Patent:

1. A wrapper sealer, containing a table having a receiving end and adapted to support wrappers and articles to be sealed therein, and a pair of oppositely disposed flap folding rollers, mounted upon and projecting up from said table toward its receiving end in lines, oblique with respect to the face of said table.

2. A wrapper sealer, containing a table having a receiving end and adapted to support wrappers and articles to be sealed therein, said table comprising two laterally separable leaves, and means for moving said leaves toward and away from each other, and a pair of oppositely disposed flap folding rollers, one mounted on each leaf and projecting toward said receiving end in lines, oblique with respect to the face of said table.

3. A wrapper sealer, comprising a table adapted to receive and support wrappers and articles to be sealed therein, said table comprising two relatively separable leaves and means for holding said leaves stationary, two oppositely disposed heat applying plates, one supported on each leaf, a transverse heat applying plate located underneath said oppositely disposed plates, and of a length capable of spanning the gap between said oppositely disposed plates when separated to their greatest extent, and means for heating all of said plates in unison.

4. A wrapper sealer, comprising a table adapted to receive and support wrappers and articles to be sealed therein, said table comprising a stationarily supported leaf and a laterally movable leaf, means for moving said movable leaf toward or away from said stationary leaf, a pair of oppositely disposed heat applying plates, one being supported by each leaf, a transverse heat applying plate below said oppositely disposed plates, and supported by said stationary table leaf, said transverse plate being of a length capable of spanning the gap between said oppositely disposed plates when separated to their greatest extent, and resistance coils, at least one being secured to each plate for heating the same.

5. A wrapper sealer, comprising a table adapted to receive and support wrappers and articles to be sealed therein, said table comprising laterally adjustable leaves, and means for moving said leaves to and from each other, heat applying plates for the end flaps and bottom of said wrappers, the bottom heat applying plate being of a length capable of spanning the gap between the end heat applying plates, when separated to their greatest extent, and a pair of oppositely disposed cooling plates spaced away from said heat applying plates, between which said wrappers are moved after heat has been applied thereto, one plate being supported by each leaf, and each having air holes through which the end flaps are exposed to the air, whereby they may be rapidly cooled.

6. In a wrapper sealer of the character described, a frame, a table supported on said frame, and comprising two substantially similar leaves, one of which is stationarily carried by said frame, and the other slidably mounted on said frame and capable of lateral movement with respect to the stationary leaf, end flap sealing devices carried by each leaf, and a bottom sealing device carried upon one of the leaves, the bottom sealing device being of a length capable of spanning the gap between the end flap sealing devices when separated to their greatest extent, and means for moving said movable leaf with respect to said stationary leaf.

7. In a wrapper sealer of the character described, a frame, a table comprising two substantially similar leaves arranged side by side, one of said leaves being stationarily mounted on said frame, and the other slidably mounted thereon to move laterally with respect to said stationary leaf, oppositely disposed end sealing devices, one supported upon each leaf, a bottom sealing device supported by the stationary leaf, a rack bar secured to the sliding leaf, and a hand operated pinion meshing with said rack bar.

8. In a wrapper sealer of the character described, a frame, a table comprising two substantially similar leaves arranged side by side, one of said leaves being stationarily mounted on said frame, and the other slidably mounted thereon to move laterally with respect to said stationary leaf, oppositely disposed end sealing devices, one supported upon each leaf, a bottom sealing device supported by the stationary leaf, a pair of rack bars secured to said slidable leaf, a pinion meshing with each rack bar, a shaft upon which said pinions are rigidly mounted, and a hand wheel fixedly secured to said shaft.

9. In a wrapper sealer of the character described, a rectangular frame, comprising longitudinal and transverse frame bars, each frame bar having a longitudinal slot formed therein, a table comprising a leaf stationarily mounted on said frame, and a movable leaf slidably mounted on said frame, each table leaf carrying a flap folding roller, an end flap heating device, and an end flap cooling device, and the stationary leaf supporting a bottom sealing device, a pair of rack bars secured to said slidable leaf, and guided in the slots of said transverse frame bars, pinions, one meshing with each rack bar, a shaft upon which said pinions are rigidly mounted, said shaft being journaled in bearings carried by said frame, and a hand wheel fixedly secured to said shaft.

10. In a wrapper sealer, a table having a gap between its ends, a bottom flap heating plate in said gap and spaced away from the adjacent edges of said table, and extending approximately flush with its upper face, a pair of oppositely disposed end flap heating plates, above said bottom flap heating plate, and supported by said table, and a pair of oppositely disposed end flap cooling plates supported by said table in line with said end flap heating plates and spaced therefrom.

11. In a wrapper sealer, a table comprising two separable leaves, each having a gap between its ends, a bottom flap heating plate extending freely through said gaps and approximately flush with the upper face of said table, said plate being secured to one leaf, a pair of oppositely disposed end flap heating plates above said bottom flap heating plate, one secured to each leaf, and a pair of oppositely disposed cooling plates, having slots therein, one supported by each leaf in alinement with an end flap heating plate and spaced therefrom.

12. A wrapper sealer, comprising a table, having two laterally separable leaves carrying two oppositely disposed side walls forming a passage having a receiving end and a discharge end, said passage being adapted for the reception of wrappers and articles to be sealed therein, means for moving said leaves toward and away from each other, and a pair of oppositely disposed end flap folding rollers, one mounted on each leaf at the receiving end of the associated side wall and projecting up and forward toward the receiving end of the table.

In witness whereof, I have executed the above at Chicago, Cook county, Illinois, this 7th day of May A. D. 1913.

FRANK STREICH.

Witnesses:
CHARLES O. SHERVEY,
ESTHER SUNDEEN.